United States Patent [19]

Edwards, III

[11] Patent Number: 4,833,823
[45] Date of Patent: May 30, 1989

[54] POTTED PLANT SUPPORT

[76] Inventor: Ogden M. Edwards, III, 6402 Melody, #1121, Dallas, Tex. 75321

[21] Appl. No.: 942,366

[22] Filed: Dec. 16, 1986

[51] Int. Cl.⁴ .............................................. A47G 7/02
[52] U.S. Cl. ................................... 47/39; 248/346.1; 108/53.3
[58] Field of Search ................ 108/24, 41, 55.3, 53.3, 108/25, 14, 26, 150, 160; 47/39; 248/346.1, 346, 146

[56] References Cited

U.S. PATENT DOCUMENTS

| | | | |
|---|---|---|---|
| 2,128,118 | 8/1938 | Burford | 248/346.1 |
| 2,301,385 | 1/1942 | Ehrgott | 248/346.1 |
| 2,486,932 | 11/1949 | Elliot | 47/71 X |
| 3,199,468 | 8/1965 | Sullivan | 108/53.3 |
| 3,199,469 | 8/1965 | Sullivan | 108/53.3 |
| 3,267,883 | 8/1966 | Vissers | 108/53.3 |
| 3,342,146 | 9/1967 | Lessheim | 108/53.3 |
| 3,477,631 | 11/1969 | Dunlap et al. | 108/55.3 |
| 3,598,065 | 8/1971 | Young | 108/53.3 |
| 3,611,952 | 10/1971 | Hoffman | 108/53.3 |
| 3,641,949 | 2/1972 | Monk | 108/53.3 |
| 3,664,272 | 5/1972 | Sanders | 108/53.3 |
| 4,018,004 | 4/1977 | Soffer | 47/39 |
| 4,279,204 | 7/1981 | Propst | 108/53.3 |
| 4,562,718 | 1/1986 | Dunk | 108/53.3 |

FOREIGN PATENT DOCUMENTS

| | | | |
|---|---|---|---|
| 151495 | 2/1952 | Australia | 248/346.1 |
| 6257 | 2/1963 | Denmark | 47/71 |
| 2358213 | 5/1975 | Fed. Rep. of Germany | 108/53.3 |
| 42136 | 5/1933 | France | 47/39 |
| 8403752 | 7/1986 | Netherlands | 47/39 |
| 337125 | 4/1959 | Switzerland | 108/53.3 |
| 127185 | 6/1960 | U.S.S.R. | 108/53.3 |
| 964056 | 7/1964 | United Kingdom | 248/346 |
| 1360471 | 7/1974 | United Kingdom | 248/346.1 |

Primary Examiner—Robert A. Hafer
Assistant Examiner—Danton D. DeMille
Attorney, Agent, or Firm—Nemschoff & Supnik

[57] ABSTRACT

A potted plant support has a circular nominally laminar portion having a top potted plant supporting generally flat surface, a bottom and plural of areally spaced apart projections extending from the bottom of the laminar portion. The projections have staggered rounded conical co-terminus ends. The nominally laminar portions is vacuum formed of unitary construction. In another example, the laminar material is formed of continuous sheets which may be cut to desired configuration. The ends evenly impact on areally spaced apart and areally limited portions of flooring distributing the weight of the potted plant among the plural projections to provide air ventilation to reduce likelihood of mold, mildew, rust and discoloration.

10 Claims, 1 Drawing Sheet

U.S. Patent
May 30, 1989
4,833,823
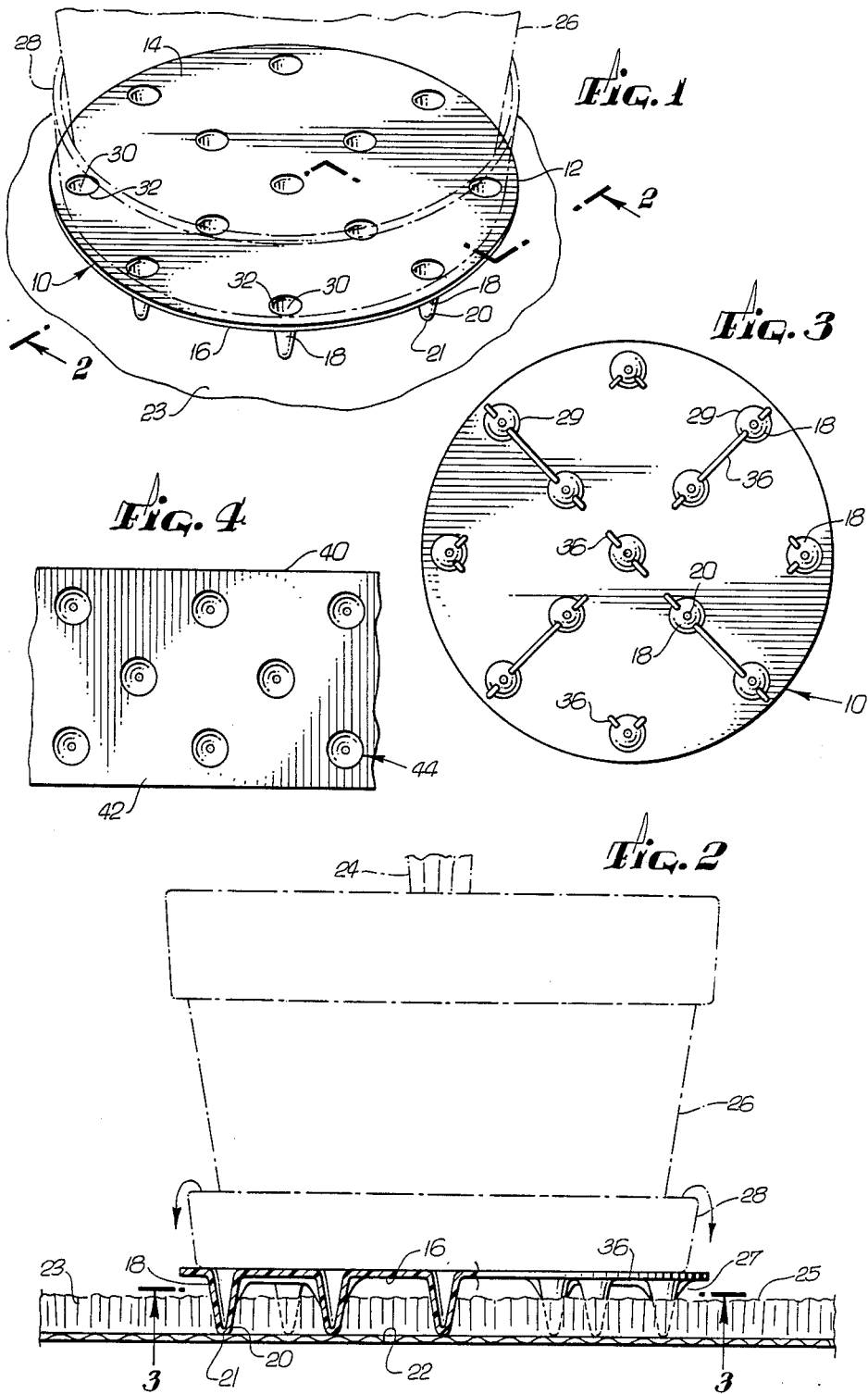

POTTED PLANT SUPPORT

1. Field of the Invention

This invention pertains to potted plant support devices. In particular, the invention pertains to devices for supporting plant pots for preventing damage to rugs and flooring.

2. Background of the Invention

Indoor plants, particularly those present in hotels, offices and institutions, are usually placed in pots, and supported on a saucer resting on flooring. The flooring is usually a hard-surfaced material or a softer surfaces such as carpeting. When saucers are placed directly on carpeting, the force exerted by the pot and the saucer has a tendency to create heavy indentations in the carpeting. For example the carpeting pile becomes compacted and generally will not return to its original form, even after the saucer supporting the pot and plant is removed. Moreover there is a tendency when watering the plant at various times for the water to seep through the pot onto the saucer, overflow the saucer and seep onto the flooring. For a hard floor it is possible that the result will be a stain on the flooring which may not be removed or may be difficult to remove. On carpeting, this may result in mildew which is generally not possible to completely remove. If the flooring is a carpet, the likelihood is that the carpet will become permanently stained and the jute backing will rot.

Therefore it would be advantageous to have an inexpensive device which allows the support of potted plants in interiors without resulting in permanent indentations in the flooring, mildew, stains or rotting.

SUMMARY OF THE INVENTION

A pot plant support in accordance with this invention generally comprises a nominally laminar material having a top generally flat surface, a bottom and a plurality of areally spaced apart projections extending from the bottom of the laminar material. A pot is then supported on the top flat surface and the projections having co-terminus ends evenly impact on areally spaced apart and areally limited portions of the flooring distributing the weight of the potted plant among the plural projections.

In a more specific example, the laminar material is circular and the projections extending from the laminar material are conical. The conical projections are staggered. The plant pot support is vacuum formed of unitary construction. In another example, the laminar material is formed in continuous sheets which may be cut to desired configuration.

BRIEF DESCRIPTION OF THE DRAWINGS

FIG. 1 is a perspective view of the plant pot support in accordance with this invention shown supporting a potted plant on a portion of a carpeted floor;

FIG. 2 is a cross sectional view taken along lines 2—2 of FIG. 1;

FIG. 3 is a bottom elevational view taken along lines 3—3 of FIG. 2; and

FIG. 4 is a portion of material in sheet form configured in accordance with this invention.

DETAILED DESCRIPTION

With particular reference to FIGS. 1, 2 and 3, a potted plant support 10 in accordance with this invention generally comprises a laminar material having a nominally planar base 12. The base 12 has a top flat surface 14 and a bottom surface 16. A plurality of conical projections 18 extend from the bottom surface 16 of the base 12. The conical projections 18 have planar coterminus end portions 20. The end portions 20 have generally rounded surfaces 21 to prevent significant impacting of a floor surface 22, allowing the surface weight of a potted plant 24, including a pot 26 to be spread over the plural spaced areas of contact of the end portions 20, yet impacting the flooring at small areally confined areal locations. This provides air ventilation to reduce problems of mold, mildew, rust and discloration.

The conical projections 18 define interior pockets 30 having circular intersections 32 with the base 12. The conical projections 18 are shown in spaced-apart staggered positions. The conical projections 18 have a length sufficient to create an air space between the bottom surface 16 and the floor surface 22 as well as the top of any floor covering 23, such as the top of the rug pile 25. A region 27 defining the airspace allows ventilation and helps prevent and limit the eventual and likely water seepage from the pot 26 and the saucer 28 from creating mold, mildew, rust and permanent stain.

The top flat surface 14 supports the plant pots 26 and plant pots saucers 28. The bottom surface 16 facing adjacent conical projections 18 has circular apertures 29 from which the conical projections extend. The top surface 24 has concave conical cup surfaces 32 facing the plant pot saucers 28. Wings 36 adjacent the region adjoining the conical projections to the bottom surface 16 result from the vacuum formation of the base 10 and add limited additional structural support of the conical projections.

With particular reference to FIG. 4, a continuous sheet 40 of nominally planar support material 40 from continuous sheets of stamped or vacuum formed material. The sheets have a top surface 42 and rows staggered 44 of concave projections extending opposite the top surface.

Thus, a potted plant support has been shown which is inexpensive to manufacture and helps prevent deterioration of flooring from mold, mildew, rust and discloration. While the invention has been shown and described with reference to particular examples thereof, it will be understood by those skilled in the art that various changes in form and details may be made therein without departing from the spirit and scope of the invention.

What is claimed is:

1. A plant pot support arrangement comprising:
    a potted plant;
    a flooring;
    a potted plant support disposed on and closely adjacent the flooring and supporting the potted plant, the potted plant support characterized by:
    a nominally planar base having a top surface and a bottom surface; and
    a plurality of projections having coterminous end portions terminating in the same plane;
    the projections having pointed, hollow, conical shaped projections extending downward from the top surface such that the hollow cavity contained within the projection is open at the top surface forming a pocket, and structural wings extending outward from the conical projections to the bottom surface for adding structural support for the arrangement;

the projections having a length sufficient to creat an airspace between the bottom surface and the flooring, the projections defining distances between adjacent projections, the projections having a length smaller than the distance between adjacent projections, whereby the airspace so created helps limit mold, mildew and permanent stain, despite potential water seepage onto the flooring.

2. The invention as set forth in claim 1 and in which the base defining openings and the openings at the top surface are circular.

3. The invention as set forth in claim 2 and in which the laminar material is vacuum formed.

4. The invention as set forth in claim 3 and in which the projections are spaced equidistant.

5. The invention as set forth in claim 3 and in which the base is circular.

6. The invention as set forth in claim 3 and in which the base is a continuous sheet.

7. The invention as set forth in claim 1 and in which the projections have end portions and the end portions are rounded.

8. The invention as set forth in claim 1 and in which the projections are staggered in rows.

9. The invention as set forth in claim 1 and in which the base is vacuum formed.

10. The invention as set forth in claim 1 and in which the flooring is carpeting defining a pile top surface, and in which the airspace is present between the top surface of the pile and the bottom surface of the base.

* * * * *